United States Patent
Gao

(10) Patent No.: US 7,817,758 B2
(45) Date of Patent: Oct. 19, 2010

(54) APPARATUS AND METHOD FOR CLOCK SYNCHRONIZATION

(75) Inventor: Xiaoyu Gao, Beijing (CN)

(73) Assignees: Vimcro Corporation, Beijing (CN); Wuxi Vimicro Corporation, Wuxi (CN)

( * ) Notice: Subject to any disclaimer, the term of this patent is extended or adjusted under 35 U.S.C. 154(b) by 503 days.

(21) Appl. No.: 11/965,731

(22) Filed: Dec. 27, 2007

(65) Prior Publication Data
US 2009/0168933 A1   Jul. 2, 2009

(30) Foreign Application Priority Data
Apr. 20, 2007   (CN) .................. 2007 1 0098576

(51) Int. Cl.
*H04L 7/00* (2006.01)
(52) U.S. Cl. ..................................... 375/354
(58) Field of Classification Search ................. 375/354, 375/320, 371, 298; 327/3, 113, 141, 157, 327/172
See application file for complete search history.

(56) References Cited
U.S. PATENT DOCUMENTS
6,057,722 A * 5/2000 Nakabo ................. 327/172

2007/0086286 A1 * 4/2007 Hsieh et al. .............. 369/44.13

* cited by examiner

*Primary Examiner*—Khai Tran
(74) *Attorney, Agent, or Firm*—Wuxi Sino IP Agency, Ltd.; Joe Zheng

(57) ABSTRACT

Techniques for synchronizing clocks are disclosed. According to one aspect of the present invention, a pair of dividing coefficients a1 and a2 is obtained from a ratio of a theoretical frequency fs1 of the first source signal to a theoretical frequency fs_local of a desired local clock signal. A least common multiple expressed as T_c is obtained from the theoretical periods T1 and T2 of the first source signal and the second source signal. A relative error expressed as k is calculated from the first and second source clock signals in a period of T_c. The first source clock signal is then divided into a first local clock signal with a period equal to T1*a1 and a second local clock signal with a period equals to T1*a2 according to the dividing coefficients a1 and a2, respectively. The clock number m of the first local clock signal and the clock number n of the second local clock signal in the period of T_c are calculated according to the relative error k and the dividing coefficients a1 and a2. The m clocks of the first local clock signal is mixed with the n clocks of the second local clock signal as m+n clocks of the desired local clock signal with the period of T_c. Thus, the local clock signal obtained as such is synchronized with both of the first and second source clock signals.

11 Claims, 4 Drawing Sheets

APPARATUS AND METHOD FOR CLOCK SYNCHRONIZATION

BACKGROUND OF THE INVENTION

1. Field of the Invention

The present invention relates to the area of digital signal processing, and more particularly to an apparatus and a method for clock synchronization.

2. Description of Related Art

It well known that a clock signal is very important for a digital device. The digital device would not work properly without a clock signal as a time reference. Generally, the digital device is configured with a local clock generator for producing a plurality of local clocks with different clock frequencies according to a common source clock signal because the digital device may comprise a plurality of functional units, each works at different clock frequencies.

FIG. 1 shows an exemplary configuration of a conventional local clock generator 100. As shown in FIG. 1, the local clock generator 100 includes a clock controller 110 for generating a dividing coefficient depending on the frequency of a source clock signal and the theoretical frequency of a desired local clock signal, and a clock divider 120 for dividing the source clock signal by the dividing coefficient in order to obtain a desired local clock signal.

As shown in FIG. 2, a first digital device 201 with a first source clock signal may be required to communicate with a second digital device 202 with a second source clock signal in some applications. Because the two digital devices work in different time domains, the local clock signal required in the communication between the first and second digital device should be synchronized with both of the first and second source clock signal for successful communication.

However, if a local clock signal is generated from the first source clock signal, the local clock signal may not be synchronized with the second source clock signal, thereby arising errors in the communication. If the local clock signal is generated from the second source clock signal, the same problem may occur.

Thus, there is a need for techniques for synchronizing the local clock signal with both of the first and second source clock signal.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to techniques for clock synchronization. A local clock signal is desired to be derived from a first source clock signal and needed to be synchronized with a second source clock signal, where the first source clock signal may be not synchronized with the second source clock signal. According to one aspect of the present invention, a pair of dividing coefficients a1 and a2 is obtained from a ratio of a theoretical frequency fs1 of the first source signal to a theoretical frequency fs_local of a desired local clock signal. A least common multiple expressed as T_c is obtained from the theoretical periods T1 and T2 of the first source signal and the second source signal. A relative error expressed as k is calculated from the first and second source clock signals in a period of T_c. The first source clock signal is then divided into a first local clock signal with a period equal to T1*a1 and a second local clock signal with a period equals to T1*a2 according to the dividing coefficients a1 and a2, respectively. The clock number m of the first local clock signal and the clock number n of the second local clock signal in the period of T_c are calculated according to the relative error k and the dividing coefficients a1 and a2. The m clocks of the first local clock signal is mixed with the n clocks of the second local clock signal as m+n clocks of the desired local clock signal with the period of T_c. Thus, the local clock signal obtained as such is synchronized with both of the first and second source clock signals.

The present invention may be implemented as a method, a circuit, or a part of a system. According to one embodiment, the present invention is a method for clock synchronization, the method comprises: obtaining a pair of dividing coefficients a1 and a2 related to a ratio of a theoretical frequency fs1 of a first source clock signal to a theoretical frequency fs_local of a desired local clock signal; getting a common multiple T_c of a theoretical period T1 of the first source clock signal and a theoretical period T2 of a second source clock signal; calculating a relative error k between the first and second source clock signals in a period of T_c; dividing the first source clock signal into a first local clock signal with a period being T1*a1 and a second local clock signal with a period being T1*a2 according to the divided coefficients a1 and a2, respectively; calculating a clock number m of the first local clock signal and a clock number n of the second local clock signal in the period of T_c according to the relative error k and the dividing coefficients a1 and a2; and mixing the m clocks of the first local clock signal with the n clocks of the second local clock signal, resulting in m+n clocks in the desired local clock signal with a period equal to T_c.

According to another embodiment, the present invention is an apparatus for clock synchronization, the apparatus comprises: a relative error calculating unit configured to receive a first source clock signal and a second source clock signal, calculate a relative error k between the first source clock signal and the second source clock signal; a dividing coefficient calculating unit configured to calculate a pair of dividing coefficients a1 and a2 according to a ratio of theoretical frequencies of the first source clock signal to a desired local clock signal; a dividing unit configured to divide the first source clock signal into a first local clock signal with a period being T1*a1 and a second local clock signal with a period being T1*a2; a variable calculating unit configured to calculate a clock number m of the first local clock signal and a clock number n of the second local clock signal according to the relative error k, the dividing coefficients a1 and a2; a clock mixing unit configured to mix the m clocks of the first local clock signal with the n clocks of the second local clock signal, resulting in m+n clocks in the desired local clock signal with a period equal to T_c.

One of the features, benefits and advantages in the present invention is to provide techniques for synchronizing clocks.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
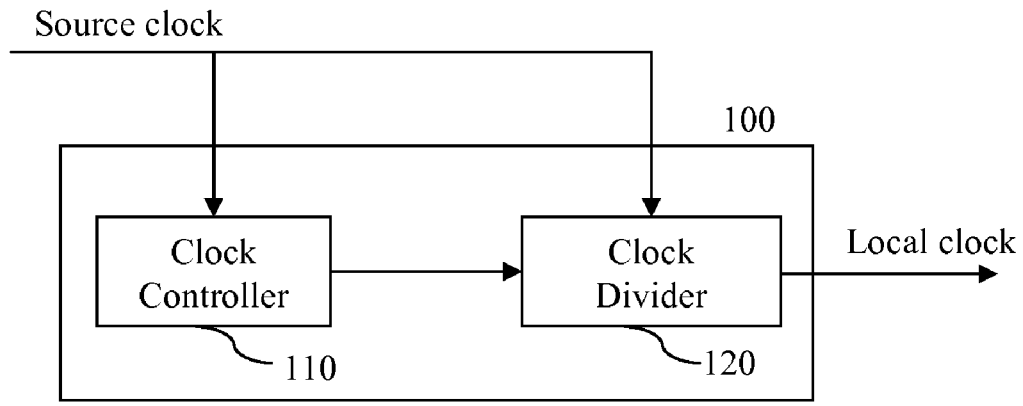
FIG. 1 is a schematic block diagram showing an exemplary configuration of a conventional lock clock generator.
Figure 2:
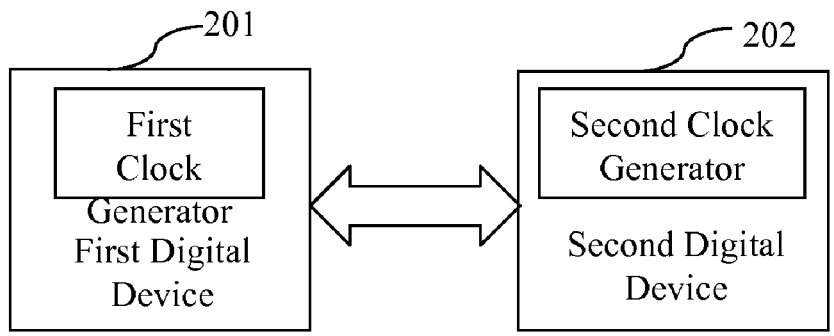
FIG. 2 is a schematic block diagram showing two digital devices in different time domains.
Figure 3:
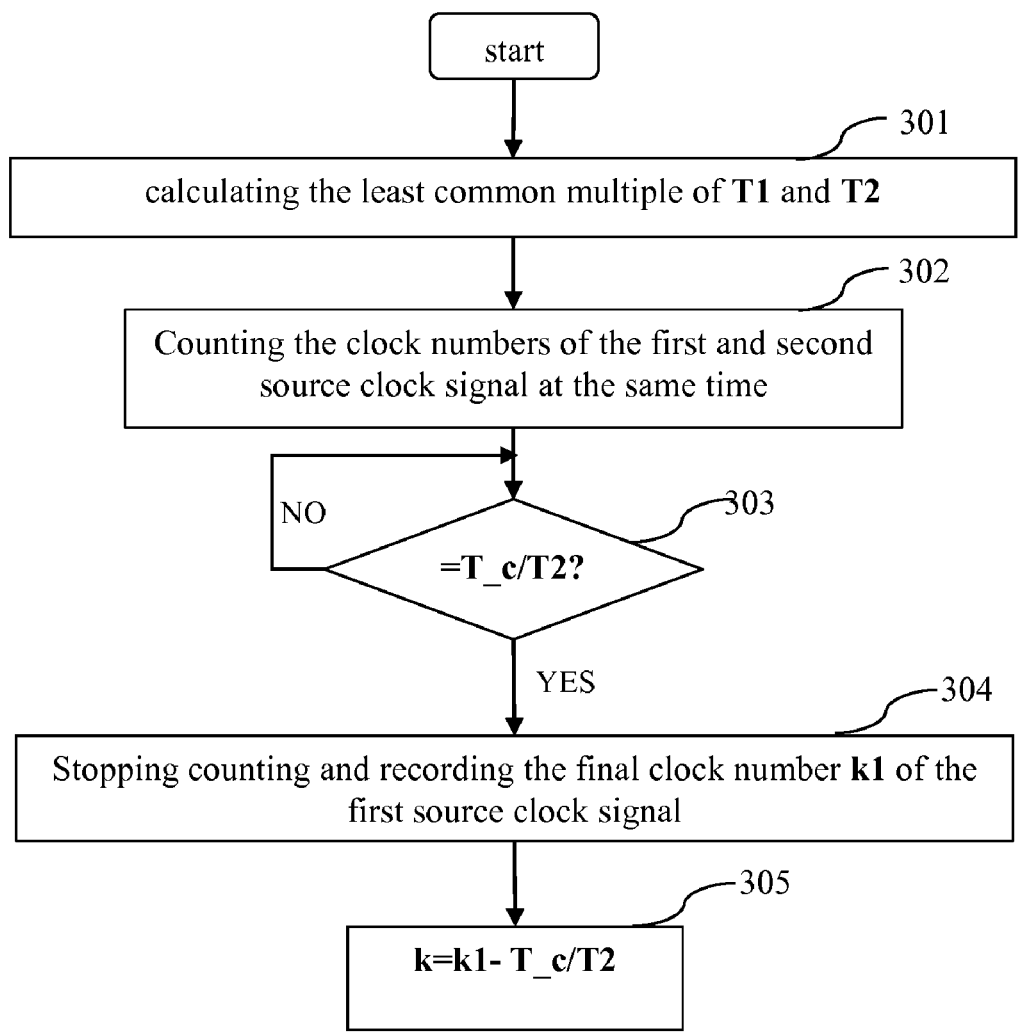
FIG. 3 shows an exemplary flowchart as to how to calculate a relative error between first and second source clock signals.
Figure 4:
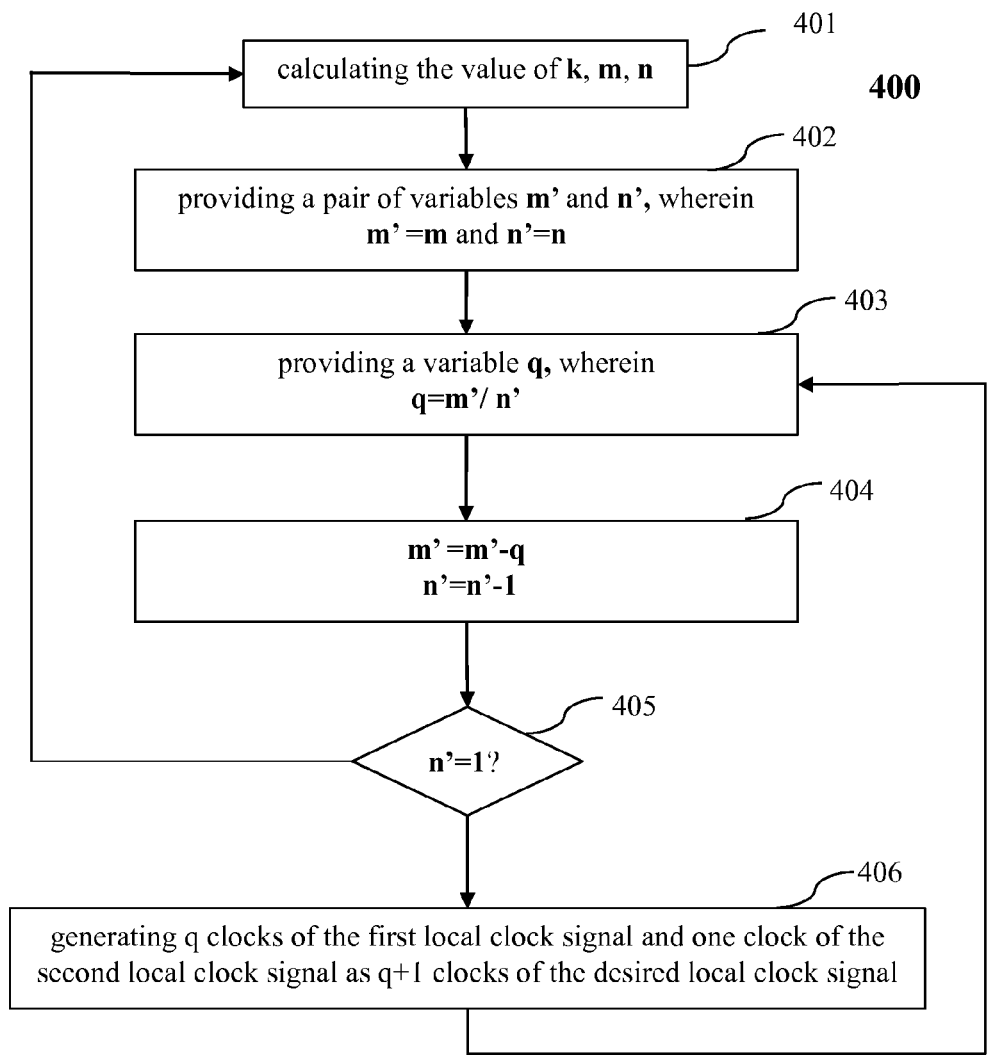
FIG. 4 shows an exemplary flowchart as to how to mix the first local clock signal and the second local clock signal as a desired local clock signal.
Figure 5:
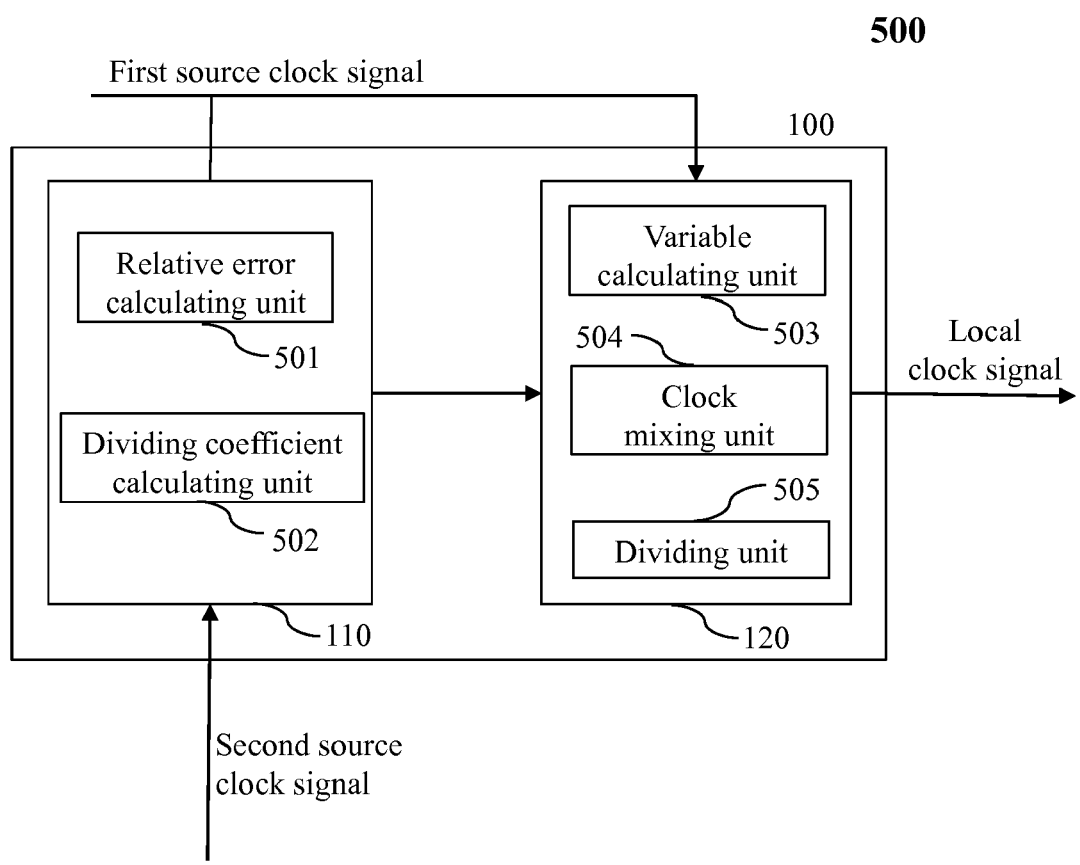
FIG. 5 is a block diagram showing an apparatus for clock synchronization according to one embodiment of the present invention.

Embodiments of the present invention are discussed herein with reference to FIGS. 3-5. However, those skilled in the art will readily appreciate that the detailed description given herein with respect to these figures is for explanatory purposes only as the invention extends beyond these limited embodiments.

It is assumed that a local clock signal is desired to be divided from a first source clock signal and needed to be synchronized with a second source clock signal according to one embodiment of the present invention. The first source clock signal may be not synchronized with the second source clock signal. The frequency of the first source clock signal, the second source clock signal and the local clock signal are expressed as fs1, fs2 and fs_local, respectively. The period of the first source clock signal, the second source clock signal and the local clock signal are expressed as T1, T2 and T_local, respectively. Theoretical values of the fs1, fs2, fs_local, T1, T2 and T_local are known.

A method for clock synchronization according to one embodiment of the present invention comprises the following processes: obtaining a pair of dividing coefficients a1 and a2 depending on the ratio of the theoretical frequency fs1 to the theoretical frequency fs_local; getting a least common multiple expressed as T_c of the theoretical period T1 and T2, and calculating a relative error expressed as k between the first and second source clock signals in a period of T_c; dividing the first source clock signal into a first local clock signal with a period equal to T1*a1 and a second local clock signal with a period equals to T1*a2 according to the dividing coefficients a1 and a2, respectively; calculating the clock number m of the first local clock signal and the clock number n of the second local clock signal in the period of T_c according to the relative error k and the dividing coefficients a1 and a2; mixing m clocks of the first local clock signal with n clocks of the second local clock signal as m+n clocks of the desired local clock signal in the period of T_c. Thus, the local clock signal obtained above is synchronized with both of the first and second source clock signals.

In one embodiment, since the relative error k is variable along with time, the relative error k has to be recalculated every third moment or so, thereby the above process is required to be repeatedly performed, accordingly.

In one embodiment, the dividing coefficients a1 and a2 may be obtained based on nearest integers of the ratio fs1/fs_local. For example, the dividing coefficient a1 equals to one nearest integer that the ratio fs1/fs_local can be rounded to. If it is rounded up, the dividing coefficient a2 is set to be a1−1, otherwise, the dividing coefficient a2 is set to be a1+1. Hence, the period of the first local clock signal obtained from the first source clock signal, according to the dividing coefficient a1, is T1*a1, and the period of the second local clock signal obtained from the second source clock signal according to the dividing coefficient a2 is T2*a2. It should be noted that T1 and T2 may not be identical.

FIG. 3 shows a flowchart or process 300 of calculating the relative error k between the first and second source clock signals in a period of T_c. At 301, the common multiple T_c of the theoretical periods T1 and T2 of the first and second source clock signals is calculated. The common multiple T_c may be a least common multiple in a preferred embodiment. At 302, the clock numbers of the first and second source clock signals are counted at the same time, for example from one. At 303, the process 300 is set to determine if the clock number of the second source clock signal is T_c/T2. If YES, the counting is stopped and the clock number k1 of the first source clock signal finally counted is recorded at 304, otherwise, the process 300 goes back to 302 to continue counting. The process 300 continues at 305, where the relative error k is calculated by subtracting T_c/T1 from k1. Thus, the relative error k is obtained.

T_c/T2 is a theoretical number of the second source clock signal counted in the period of T_c, and T_c/T1 is also a theoretical number of the first source clock signal counted in the period of T_c. If the theoretical periods of the fist and second source clock signals are consistent with corresponding actual periods of the first and second source clock signals, respectively, the relative error k ought to be zero.

It should be noted that the relative error k can be calculated by testing the second source clock signal depending on the first source clock signal in an alternative embodiment. Namely, the clock number k2 of the second source clock signal is recorded until the clock number of the first source clock signal is counted to T_c/T1, and then the relative error k can be calculated according to the expression: k=k2−T_c/T2.

It is assumed that there are m clocks in the first local clock signal and n clocks in the second local clock signal. Thus there are m+n clocks in the local clock signal with a period of T_c. The followings equations can be set in accordance with a relative error k.

$$a1*m+a2*n=T\_c/T1+k,$$

$$m+n=T\_c/T\_\text{local}$$

After the relative error k and the dividing coefficients a1 and a2 are obtained, the value of m and n can also be calculated according to the above equations.

For example, it is assumed that fs1=480 MHz, fs2=8 KHz, fs_local=12.88 MHz. Thus, fs1/fs_local=480 MHz/12.88

MHz=39.0625, a1=39, a2=a1+1=40, T_c=⅛ ms, T_c/T1=60000, T_c/T_local=1536. With the values of a1, a2 and T_c/T1, T_c/T_local, the above equations take the form of:

$$39*m+40*n=60000+k,$$

$$m+n=1536$$

It is assumed that the relative error is K=1, it can be calculated that the value of m is equal to 1439 and the value of n is equal to 97.

FIG. 4 shows a flowchart or process 400 of mixing the m clocks of the first local clock signal and the n clocks of the second local clock signal to produce a desired local clock signal with a period of T_c.

As shown in FIG. 4, the process 400 begins at 401, where the values of the relative error k, the clock number n of the second local clock signal and the clock number m of the first local clock signal are calculated. At 402, the process 400 provides a pair of variables m' and n' and makes the variable m' equal to m and the variable n' equal to n initially. At 403, the process 400 further provides a variable q and makes the variable q equal to an integral portion of the ratio of the variable m' to the variable n' so that the value of the variable q is an integer.

At 404, the value q is subtracted from the variable m' and the result is stored to the variable m', namely m'=m'−q. Similarly, a value of 1 is subtracted from the variable n' and the result is stored back to the variable n', namely n'=n'−1. At 405, the process 400 determines if the value of the variable n' is equal to 1, if YES, the process 400 returns to 401; otherwise, the process 400 goes to 406, where q clocks of the first local clock signal and 1 clock of the second local clock signal are generated as q+1 clocks of the desired local clock signal, then the process 400 returns to 403. Thus, the clock sequence of the first and second local clock signals may be q, 1, q, 1, q, 1, etc. so that the first local clock signal can be properly and evenly mixed with the second local clock signal. It should be noted that the value of the variable q may be varying along with the process 400. As the above processes repeated, the local clock signal synchronized with both of the first and second source clock signals is continuously generated.

In another embodiment, the YES branch of the block 405 may set to go to 402, where the values of k, m, n are not required to be recalculated when n'=1. Additionally, the block 405 can also be placed behind the block 406 and the judgment condition of the block 405 can be modified to "if the value of the variable n' is equal to 0". As a result, while the variable n' decrease from n to 0, a total clock number of the first local clock signal is m, and a total clock number of the second local clock signal is n. As a result, there are m+n clocks in the local clock signal that is synchronized with both of the first and second source clock signals.

In order to further understand the present invention, FIG. 5 shows an exemplary configuration of the apparatus 100 according to one embodiment of the present invention. The device 110 comprises a clock controller 110 including a relative error calculating unit 501 and a dividing coefficient calculating unit 502, and a clock divider 120 including a variable calculating unit 503, a clock mixing unit 504 and a dividing unit 505.

The relative error calculating unit 501 is configured to receive the first and second source clock signals, calculate the relative error k between the first source clock signal and the second source clock signal in the period T_c according to an instruction from the clock divider 120 and output the relative error to the clock divider 120.

The dividing coefficient calculating unit 502 is configured to calculate a pair of dividing coefficients a1 and a2 according to the ratio of theoretical frequency of the first source clock signal to the desired local clock signal, and output the dividing coefficients a1 and a2 to the clock divider 120.

The dividing unit 505 is configured to divide the first source clock signal into the first local clock signal with a period equal to T1*a1 and the second local clock signal with a period equal to T1*a2.

The variable calculating unit 503 is configured to calculate the clock number m of the first local clock signal and the clock number n of the second local clock signal according to the relative error k, the divided coefficients a1 and a2 received from the clock controller 110 and the above equation group.

The clock mixing unit 504 is configured to mix the m clocks of the first local clock signal with the n clocks of the second local clock signal as m+n clocks of the desired local clock signal in the period of T_c. The clock mixing unit 504 includes an update unit for informing the clock controller 110 of updating the relative error k so that the value of m, n can also be recalculated after a predetermined moment such as a period of T_c. there are a lots of ways to mix the m clocks of the first local clock signal with the n clocks of the second local clock signal. For example, it can be implemented according to the flow shown in FIG. 4.

It should be noted the local clock signal can also be divided from the first source clock signal and be synchronized with the first source clock signal in the same way in other embodiment of the present invention.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for clock synchronization, the method comprising:
    obtaining a pair of dividing coefficients a1 and a2 related to a ratio of a theoretical frequency fs1 of a first source clock signal to a theoretical frequency fs_local of a desired local clock signal;
    getting a common multiple T_c of a theoretical period T1 of the first source clock signal and a theoretical period T2 of a second source clock signal;
    calculating a relative error k between the first and second source clock signals in a period of T_c;
    dividing the first source clock signal into a first local clock signal with a period being T1*a1 and a second local clock signal with a period being T1*a2 according to the dividing coefficients a1 and a2, respectively;
    calculating a clock number m of the first local clock signal and a clock number n of the second local clock signal in the period of T_c according to the relative error k and the dividing coefficients a1 and a2; and
    mixing the m clocks of the first local clock signal with the n clocks of the second local clock signal, resulting in m+n clocks in the desired local clock signal with a period equal to T_c.

2. The method according to claim 1, wherein the dividing coefficients a1 and a2 are respectively equal to nearest integers of a ratio of fs1 to fs_local.

3. The method according to claim 2, wherein the dividing coefficient a1 equals to a nearest integer that the ratio fs1/ fs_local is rounded to, if the ratio fs1/fs_local is rounded up, the dividing coefficient a2 is a1-1, otherwise, the dividing coefficient a2 is a1+1.

4. The method according to claim 1, wherein the common multiple T_c is a least common multiple.

5. The method according to claim 1, wherein the calculating of the relative error k is performed by testing the first source clock signal depending on the second source clock or testing the second source clock signal depending on the second source clock in the period of T_c.

6. The method according to claim 5, wherein the calculating of the relative error k comprises:
   counting a clock number of the first source clock signal and a clock number of a second source clock signal;
   when the clock number of the second source clock signal is counted to T_c/T2, recording the clock number of the first source clock signal finally counted;
   subtracting T_c/T1 from the clock number of the first source clock signal to get the relative error k; and wherein T_c/T2 is a theoretical number of the second source clock signal counted in the period of T_c, and the T_c/T1 is a theoretical number of the first source clock signal counted in the period of T_c.

7. The method according to claim 1, wherein the calculating of the clock number m of the first local clock signal and the clock number n of the second local clock signal is performed according to a following equation group:

$$a1*m+a2*n=T\_c/T1+k; \text{ and}$$

$$m+n=T\_c/T\_local.$$

8. The method according to claim 1, wherein the mixing of the m clocks of the first local clock signal with the n clocks of the second local clock signal comprises:
   providing a pair of variables m' and n' and setting m' equal to m and n' equal to n initially;
   providing a variable q and setting q equal to an integral portion of the ratio of the variable m' to the variable n';
   generating q clocks of the first local clock signal and 1 clock of the second local clock signal, and q+1 clocks of the desired local clock signal;
   subtracting q from m' and subtracting 1 from n'; and determining if n' is equal to 0, if YES, resetting m' equal to m and n' equal to n.

9. The method according to claim 1, wherein the relative error k is recalculated every predetermined moment.

10. An apparatus for clock synchronization, comprising:
    a relative error calculating unit configured to receive a first source clock signal and a second source clock signal, calculate a relative error k between the first source clock signal and the second source clock signal;
    a dividing coefficient calculating unit configured to calculate a pair of dividing coefficients a1 and a2 according to a ratio of theoretical frequencies of the first source clock signal to a desired local clock signal;
    a dividing unit configured to divide the first source clock signal into a first local clock signal with a period being T1 *a1 and a second local clock signal with a period being T1 *a2;
    a variable calculating unit configured to calculate a clock number m of the first local clock signal and a clock number n of the second local clock signal according to the relative error k, the dividing coefficients a1 and a2;
    a clock mixing unit configured to mix the m clocks of the first local clock signal with the n clocks of the second local clock signal, resulting in m+n clocks in the desired local clock signal with a period equal to T_c.

11. The apparatus according to claim 10, wherein the clock mixing unit includes an update unit for informing the relative error of updating the relative error k every predetermined moment.

* * * * *